United States Patent
Shida et al.

(10) Patent No.: US 6,770,162 B2
(45) Date of Patent: Aug. 3, 2004

(54) METHOD OF MANUFACTURING A DISK AND TRANSFER METHOD FOR THE DISK

(75) Inventors: Noriyoshi Shida, Saitama (JP); Keiji Suga, Saitama (JP)

(73) Assignee: Pioneer Corporation, Tokyo (JP)

( * ) Notice: Subject to any disclaimer, the term of this patent is extended or adjusted under 35 U.S.C. 154(b) by 5 days.

(21) Appl. No.: 09/961,167

(22) Filed: Sep. 24, 2001

(65) Prior Publication Data

US 2002/0036056 A1 Mar. 28, 2002

(30) Foreign Application Priority Data

Sep. 28, 2000 (JP) ..................................... P2000-296876
Dec. 27, 2000 (JP) ..................................... P2000-399563

(51) Int. Cl.$^7$ .................... B44C 1/165; B32B 31/20; B11B 7/26; B11B 7/24
(52) U.S. Cl. ................. 156/230; 156/230; 156/247; 156/240; 369/283; 369/284; 369/286; 346/135.1; 346/137; 430/270.11
(58) Field of Search ........................ 156/230, 240, 156/247, 289, 60, 285, 292, 275.5; 427/236, 275, 162; 369/280, 286, 281, 284, 275.5, 283; 346/135.1, 137; 430/270.11

(56) References Cited

U.S. PATENT DOCUMENTS

| 4,978,593 A | | 12/1990 | Yin et al. | |
|---|---|---|---|---|
| 5,146,438 A | * | 9/1992 | Harper | 369/13.39 |
| 5,318,653 A | * | 6/1994 | Toide et al. | 156/295 |
| 5,378,517 A | * | 1/1995 | Suzuki et al. | 428/64.4 |
| 5,966,367 A | * | 10/1999 | Takasu et al. | 369/275.1 |
| 5,993,592 A | * | 11/1999 | Perego | 156/292 |
| 6,254,716 B1 | * | 7/2001 | Russell et al. | 156/286 |
| 6,406,770 B1 | * | 6/2002 | Ebisawa et al. | 428/64.1 |

FOREIGN PATENT DOCUMENTS

| EP | 0 723 266 A | | 7/1996 | |
|---|---|---|---|---|
| JP | 61 194662 A | | 8/1986 | |
| JP | 02-269030 | * | 11/1990 | ........... B29D/17/00 |
| JP | 02-312024 | * | 12/1990 | ............ G11B/7/24 |
| JP | 2000-76711 | * | 3/2000 | ............ G11B/7/26 |
| WO | WO 97/35720 A | | 10/1997 | |

* cited by examiner

Primary Examiner—J. A. Lorengo
(74) Attorney, Agent, or Firm—Morgan, Lewis & Bockius LLP (57) ABSTRACT

In case of manufacturing a disk having a two-layer structure, a glass substrate 13 is bonded to a cover layer 11 through an adhesive layer 12, and a mount hole 14a is formed in a center thereof to form a bonded substrate 14 having a three-layer structure (a). In a state where a stamper 15 formed a predetermined pit pattern is set to a center boss 16, the bonded substrate 14 is pressed downward in a vertical direction while the mount hole 14a of the bonded substrate 14 is aligned with the center boss 16(b). Whereby an information recording surface 11a is transferred onto the cover layer 11(c). Subsequently, after the bonded substrate 14 has been bonded to another layer substrate of the disk, the adhesive layer 12 is removed to separate the glass substrate 13. Finally, there is manufactured the disk having the two-layer structure.

11 Claims, 11 Drawing Sheets

METHOD OF MANUFACTURING A DISK AND TRANSFER METHOD FOR THE DISK

BACKGROUND OF THE INVENTION

1. Filed of the Invention

The present invention relates to a method of manufacturing a disk, such as a DVD, and more particularly, to a technical field pertaining to a method of manufacturing a disk by means of bonding together substrates, each having formed therein pits and grooves carrying recorded information.

2. Description of the Related Art

Demand for a further improvement in recording density has recently existed for disks such as DVDs, and attention has been paid to a multilayer disk having a bonded structure of information recording surfaces of disks. For example, in case of a two-layer disk, two substrates for bonding purpose, each having an information recording surface, are manufactured separately. An intermediate bonding layer made of an adhesive is provided on one of the substrates which remains stationary. The other substrate is aligned and stacked onto the intermediate bonding layer, thereby constituting a two-layer disk. In connection with such a two-layer disk, information can be recorded on either layer of a single disk, and the thus-recorded information can be read selectively, as required. Hence, the recording capacity of a disk can be increased.

An increase in the numerical aperture of an optical system for further improving recording density has been under review. In this case, a focal length to a recording layer in the two-layer disk becomes smaller, and hence the substrates to be bonded assume an ultra-small thickness on the order of 100 $\mu$m. When such thin substrates are bonded together, accurate alignment of the substrates is not easy. Since substrates are thin and have insufficient rigidity, the substrates become prone to nonuniform deformation or warpage during alignment. Thus, sustaining bonded surfaces flat becomes difficult, thereby posing a higher risk of the substrates being bonded together with eccentricity or positional misalignment arising in a part of the substrates.

The present invention has been conceived to solve the problem and is aimed at providing a disk manufacturing method which enables manufacture of a multilayer disk with superior positional accuracy while preventing occurrence of deformation or warpage, maintaining flat bonded surfaces, and preventing occurrence of eccentricity or positional misalignment even when very thin substrates of insufficient rigidity are bonded together.

SUMMARY OF THE INVENTION

In order to solve the problem, according to a first aspect of the invention, there is provided a disk manufacturing method for manufacturing a disk having a laminated structure, comprising the steps of:

fixing a reinforcement substrate for reinforcing a first substrate onto the first substrate acting as one layer of the disk;

aligning the first substrate fixed to the reinforcement substrate to a second substrate serving as another layer of the disk;

bonding the first substrate fixed to the reinforcement substrate to the second substrate through an intermediate adhesive layer; and separating the reinforcement substrate from the first substrate.

According to the invention, when there is manufactured the disk having the laminated structure, since the reinforcement substrate is integrally fixed to the first substrate in the fixing step, even if the first substrate has a small thickness, stiffness is ensured to prevent occurrence of deformation or warpage. In the aligning step and the bonding step, the reinforced first substrate is aligned with the second substrate to bond them together through the intermediate adhesive layer. In the separating step, the reinforcement substrate is separated from the first substrate after the first substrate and the second substrate have been bonded together. Accordingly, a bonded surface is maintained to be smooth by the reinforcement substrate, thereby ensuring a high degree of positional accuracy. Occurrence of positional misalignment and eccentricity is prevented, thereby enabling accurate bonding of disks.

According to a second aspect of the invention, there is provided the disk manufacturing method according to the first aspect of the invention, further comprising the steps of:

aligning the first substrate to a stamper having a pit pattern; and transferring the pit pattern onto the first surface.

According to the invention, when the disk having the laminated structure is manufactured, in the fixing step, the stiffness of the first substrate is ensured to prevent occurrence of deformation or warpage and in the aligning and bonding steps, occurrence of positional displacement and eccentricity can be prevented as well as the first aspect of the invention. In addition, in the transferring step, the pit pattern is transferred to the reinforced first substrate by using the stamper. Accordingly, the pit pattern formed on the first substrate in the transferring step is accurately aligned by the reinforcement substrate. Hence, positional accuracy of an information recording surface on another layer of the disk having the laminated structure can be ensured.

According to a third aspect of the invention, there is provided the disk manufacturing method according to the second aspect of the invention, wherein the aligning step of aligning the first substrate to the stamper, the transferring step, and the other steps are performed in this order.

According to the invention, when the disk having the laminated structure is manufactured, the pit pattern is transferred onto the first substrate by using the stamper before the first substrate is reinforced. Subsequently, the fixing step, the aligning step, and the bonding step are performed as well as the first and second aspects of the invention to ensure the stiffness of the first substrate and preventing occurrence of positional misalignment and eccentricity of disks. Accordingly, even when an information recording surface (the pit pattern) has already been transferred onto the first substrate at manufacturing the disk, the first substrate is reinforced by using the reinforcement substrate to bond disks. Hence, there can be ensured positional accuracy of a disk having a laminated structure as well as the first and second aspects of the invention.

According to a fourth aspect of the invention, there is provided the disk manufacturing method according to any one of the first to third aspects of the invention, wherein the fixing step fixes the reinforcement substrate to the first substrate through an adhesive layer; and the separating step separates the reinforcement substrate from the first substrate by reducing adhesive strength of the adhesive layer.

According to the invention, in the fixing step, the reinforcement substrate is integrally bonded to the first substrate through the adhesive layer. In the separating step, the adhesive strength of an adhesive layer is reduced to separate the reinforcement substrate from the first substrate. Hence, use of an adhesive sheet whose adhesive strength reduces at temperature or upon exposure to UV rays or use of electrostatic electricity enables easy fixing and separation of the first substrate to and from a substrate having high stiffness.

According to a fifth aspect of the invention, there is provided the disk manufacturing method according to any one of the first to third aspects of the invention, wherein the fixing step uses a fixing member to fix the reinforcement substrate to the first substrate; and the separating step removes the fixing member to separate the reinforcement substrate from the first substrate.

According to the invention, in the fixing step, the first substrate is integrally bonded to the reinforcement substrate by the fixing member. In the separating step, the fixing member is removed to separate the reinforcement substrate from the first substrate. Accordingly, a fixing member having a structure for pressing the first substrate to a substrate having high rigidity in a state where the substrate closely contact with the first substrate, the fixing member is attached, and whereby it can be easily performed to fix and separate the first substrate to and from the substrate having high rigidity.

According to a sixth aspect of the invention, there is provided the disk manufacturing method according to any one of the first to third aspects of the invention, wherein the reinforcement substrate has higher rigidity than the first substrate.

According to the invention, in the fixing step, a substrate having high rigidity is integrally fixed to the first substrate. Hence, the first substrate can be sufficiently reinforced by, for example, glass substrate which is thicker than the first substrate and sufficiently assure rigidity, and positional accuracy in the bonding and transferring steps can be improved further.

According to a seventh aspect of the invention, there is provided the disk manufacturing method according to any one of the first to third aspects of the invention, wherein the alignment step aligns the first substrate fixed to the reinforcement substrate to the second substrate in relation to a peripheral direction of the first substrate fixed to the reinforcement substrate.

According to the invention, in the bonding step, the first and second substrates are aligned with each other in relation to the peripheral direction of the first substrate fixed to the reinforcement substrate. Hence, two layers of disks in which conditions of recording areas depending on peripheral directions of the disks are different from each other can be accurately aligned with each other.

According to a eighth aspect of the invention, there is provided the disk manufacturing method according to the second aspect of the invention, wherein the alignment step uses a center and peripheral portion of the first substrate fixed to the reinforcement substrate as reference positions to align the first substrate fixed to the reinforcement substrate to the second substrate.

According to the invention, since a center of a disk and a peripheral portion of a disk are used as the reference positions for alignment, positions of the centers of the disks and positions in peripheral directions of the disks in a two-layer disk can be accurately aligned respectively.

According to a ninth aspect of the invention, there is provided the disk manufacturing method according to the seventh aspect of the invention, wherein the alignment step uses a plurality of peripheral portions of the reinforcement substrate as reference positions to align the first substrate fixed to the reinforcement substrate to the second substrate.

According to the invention, the plurality of the peripheral portions of the disk are used as the reference positions when aligning in relation to the peripheral direction of the disk. Hence, each of positions of overall areas on the two-layer disk can be accurately aligned.

According to a tenth aspect of the invention, there is provided a disk transfer method comprising the steps of:

fixing a reinforcement substrate for reinforcing a first substrate onto the first substrate acting as one layer of the disk;

aligning the first substrate to a stamper having a pit pattern;

transferring the pit pattern onto the first substrate; and separating the reinforcement substrate from the first substrate.

According to the invention, in case that the pit pattern is transferred onto a disk having laminated structure, in the fixing step, the stiffness of the first embodiment can be ensured as well as the invention on the disk manufacturing method. In the transferring step, the pit pattern is transferred onto the reinforced first substrate by using the stamper. Hence, a high degree of positional accuracy of a pit pattern or the like formed on the first substrate in the transferring step can maintained.

BRIEF DESCRIPTION OF THE DRAWINGS

FIGS. 9A and 9B are illustrations showing a structure of a bonded substrate integrally formed of a cover layer and a glass substrate according to a modification of the third embodiment;

DETAILED DESCIRPTION OF THE PREFERRED EMBODIMENTS (First Embodiment)

Preferred embodiments of the present invention will be described hereinafter with reference to the accompanying drawings. There will now be described a first embodiment of manufacturing a two-layer disk having two-layer structure by means of bonding two substrates.

Figure 1A:
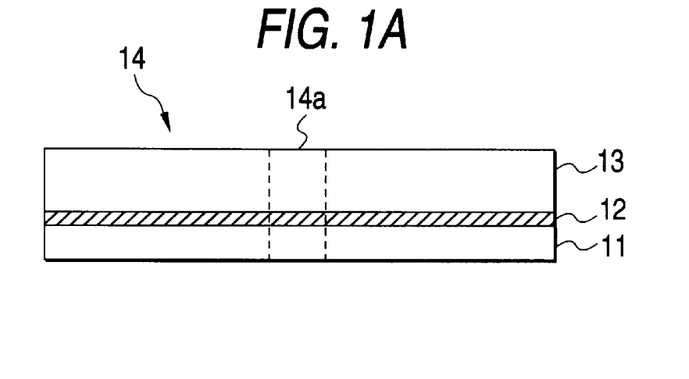
FIGS. 1A through 1C are illustrations for describing a reinforcement process and a transfer process with regard to a method of manufacturing a two-layer disk according to a first embodiment.

With reference to FIGS. 1A through 3C, there will be described a method of manufacturing a two-layer disk according to a first embodiment. FIGS. 1A through 1C are illustrations for describing, in the method of manufacturing a two-layer disk according to the first embodiment, a reinforcement process for bonding a glass layer to a cover layer to reinforce the cover layer and a transfer process for transferring a signal recording surface to a cover layer.

As shown in FIG. 1A, in the reinforcement process, there is prepared a cover layer 11 as a first substrate for acting as a first layer of the two-layer disk. The cover layer 11 is made of, e.g., an acrylic material, and has a thickness of about 70 µm and a shape of a disk having a diameter of about 120 mm. The cover layer 11 is thin and cannot ensure sufficient stiffness. In its present form, it is difficult to perform accurate alignment of the cover layer in the transfer process and a bonding process described later.

In the first embodiment, a glass substrate 13 acting as a reinforcement substrate for improving the stiffness of the cover layer 11 is secured on the cover layer 11, thereby enforcing the cover layer 11. As shown in FIG. 1A, the cover layer 11 and the glass substrate 13 are bonded together through an adhesion layer 12, thereby forming a bonded substrate 14 having three-layer structure, which is an object of alignment in a disk bonding process described later.

For example, a glass plate of about 1 mm thickness is used as the glass substrate 13. Within a range in which hardness and ease of manufacturing are maintained well, a glass plate of required thickness may be utilized. Material other than glass may also be utilized as a reinforcement substrate, so long as a similar function can be implemented.

As will be described later, there is a necessity of separating the glass substrate 13 from the cover layer 11 in a separation process, which is the final process. For this reason, as the adhesive layer 12 there is employed a sheet which can bond at ambient temperature the cover layer 11 to the glass substrate 13 by means of adhesive strength and whose adhesive strength drops when heated. As the adhesive layer 12, there may also be employed a sheet which enables bonding by means of adhesive force at normal times and whose adhesive strength drops upon exposure of UV rays or employed electrostatic force.

There may also be employed material which effects bonding with weak adhesive force at normal times and which enables separation when being susceptible to external force. A porous material may be used as the adhesive layer 12, and the porous material may be sucked by means of an air vacuum through the glass substrate 13 having apertures formed therein.

A mount hole 14a having a diameter of 15 mm is formed in the center of the bonded substrate 14 shown in FIG. 1A so as to penetrate through the cover layer 11, the adhesive layer 12, and the glass substrate 13. As will be described later, the transfer process and the bonding process are performed while setting mount hole 14a to a center boss. For this reason, particularly, there is a necessity of forming the mount hole 14a in the glass substrate 13 with high accuracy.

Figure 1B:
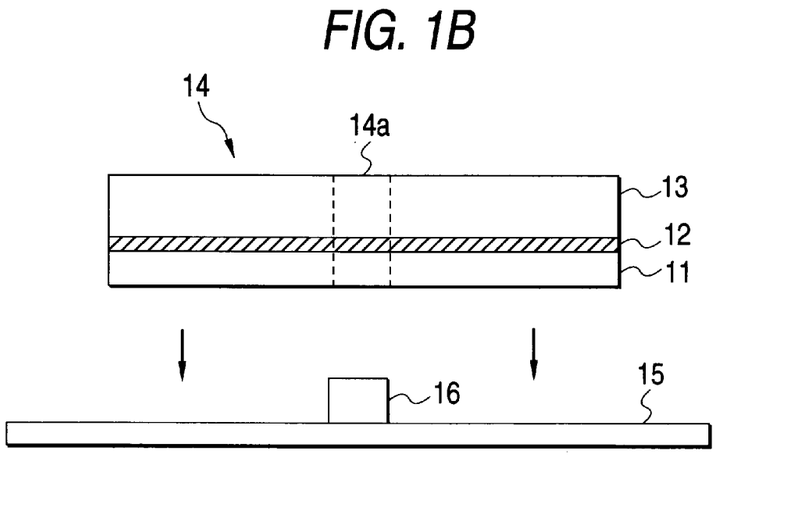

As shown in FIG. 1B, in the transfer process, the bonded substrate 14 integrated as described above is subject to transfer by means of a stamper 15. The stamper 15 is a metal disk formed thereon irregularities of a pit pattern corresponding to an information recording surface of the cover layer 11. A UV curing sheet (not shown) is applied to the top of the stamper 15 to have a thickness of about 20 µm with center hole of the stamper 15 fitted into the fixed center boss 16.

In this state, the bonded substrate 14 is caused to approach the stamper 15 while being aligned with the center boss 16, and the center boss 16 is set to the mount hole 14a. Subsequently, pressure is applied to the bonded substrate 14, thereby pressing the bonded substrate 14 to the stamper 15 at right angles. Then, the bonded substrate 14 is exposed to UV rays, thus hardening the UV curing sheet to transfer the pit pattern on the stamper 15 to the cover layer 11. Incidentally, the hardened UV curing sheet is integrated with the cover layer 11.

Figure 1C:
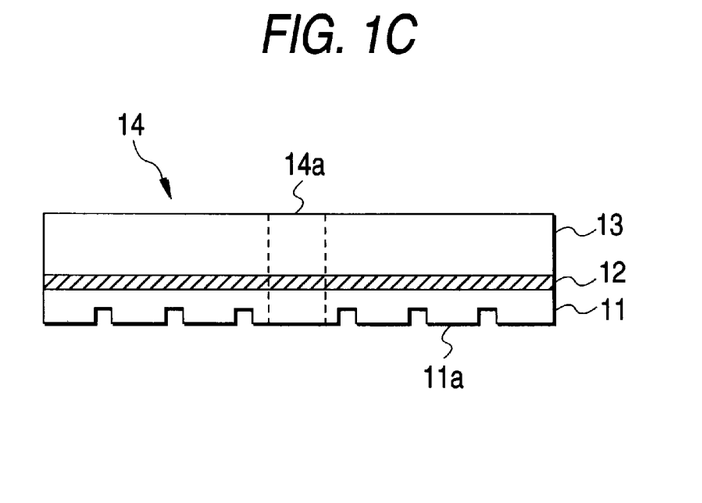

As shown in FIG. 1C, in a state in which the bonded substrate 14 is separated from the stamper 15, the information recording surface 11a having a predetermined pit pattern is formed on the surface of the cover layer 11. At this time, the positional accuracy of the pit pattern on the information recording surface 11a is an accuracy in case that alignment is performed in the transfer process by means of an inner diameter of the mount hole 14a and an outer diameter of the center boss 16. The positional accuracy will be described in detail later.

Figure 2A:
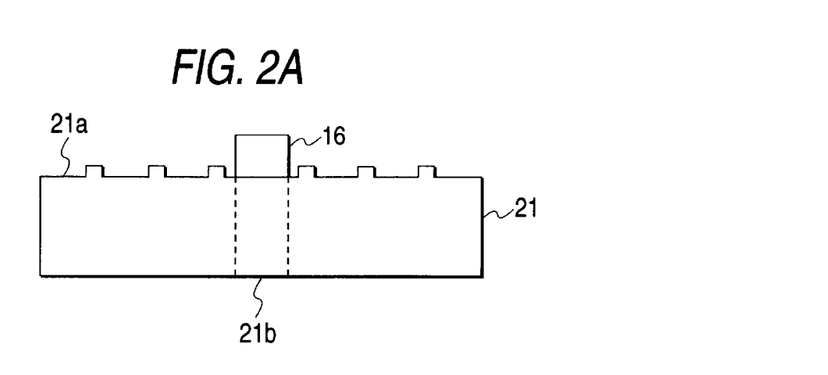
FIGS. 2A through 2C are illustrations for describing a disk bonding process following the reinforcement process and the transfer process shown in FIG. 1 with regard to the method of manufacturing a two-layer disk according to the first embodiment.
Figure 2B:
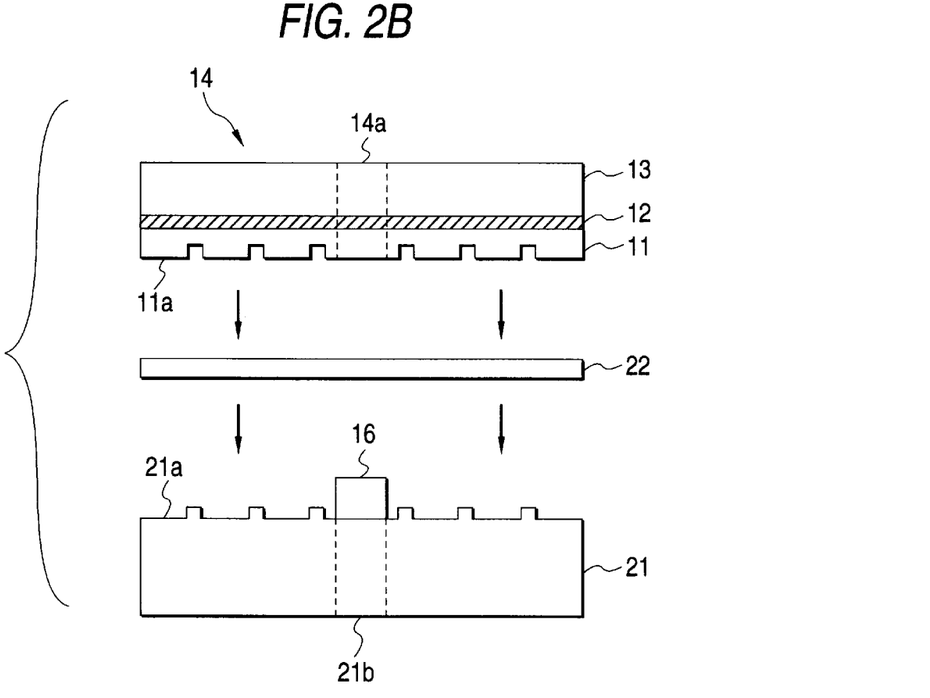
Figure 2C:
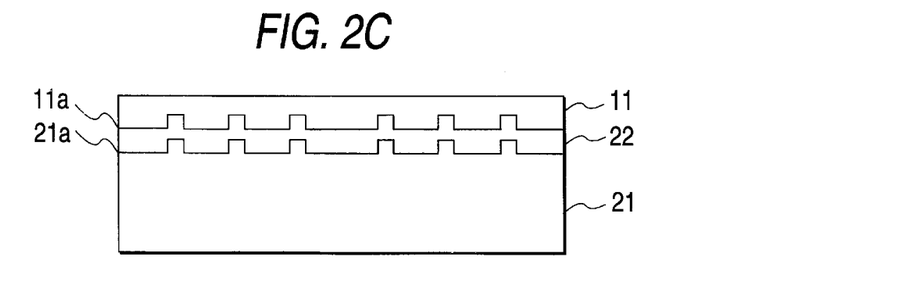

FIGS. 2A through 2C describe, in the method of manufacturing a two-layer disk according to the first embodiment, the disk bonding process to be performed following the processes shown in FIG. 1 and a separation process of removing the adhesive layer 12 to separate the glass substrate 13.

As shown in FIG. 2A, in the disk bonding process, a substrate 21 to be fixed during a bonding process is prepared. The substrate 21 is formed of polycarbonate and has a thickness of about 1.1 mm and a shape of a disk having a diameter of about 120 mm. An information recording surface 21a having a predetermined pit pattern is formed on a surface of the substrate 21 by means of applying injection molding to the substrate 21 in advance. A mount hole 21b having a diameter of 15 mm is formed in a center of the substrate 21 in the same manner as the bonded substrate 14. At the time of the disk bonding process, the substrate 21 is set to the center boss 16.

As shown in FIG. 2B, the substrate 21 set to the center boss 16 is bonded to the bonded substrate 14. As shown in FIG. 2B, after a reflection film and a protective film have been formed on the surface of the substrate 21, a UV curing sheet 22 is applied over a top of the substrate 21 to have a thickness of about 20 µm. The UV curing sheet 22 acts as a bonding intermediate layer to be laminated between the information recording surface 21a of the substrate 21 and the information recording surface 11a of the bonded substrate 14.

The bonded substrate 14 is caused to approach the substrate 21 while being aligned with the center boss 16. The center boss 16 is set to the mount hole 14a. Incidentally, it is assumed that a reflection film and a protective film are provided on the information recording surface 11a of the bonded substrate 14. Then, the bonded substrate 14 is applied with pressure and is pressed against the substrate 21 at right. Subsequently, the UV curing sheet 22 is hardened upon exposure to UV rays, and then the substrate 21, the curing sheet 22, and the bonded substrate 14 are integrated together.

As shown in FIG. 2C, in the separation process, the glass substrate 13 is separated from the bonded substrate 14 integrated with the substrate 21, along with the adhesive layer 12. That is, in case that, as the adhesive layer 12, there is employed a sheet whose adhesive strength drops when heated, the adhesive strength of the adhesive layer 12 is dropped by means of heating the bonded substrate 14, and as a result of this, the glass substrate 13 can be separated from the cover layer 11. Whereby there are stacked together the cover layer 11, the substrate 21 and the UV curing sheet 22 constituting the bonding intermediate layer to be interposed between the cover layer 11 and the substrate 21. There is manufactured a two-layer disk having the two information recording surfaces 11a and 21a.

Figure 3A:
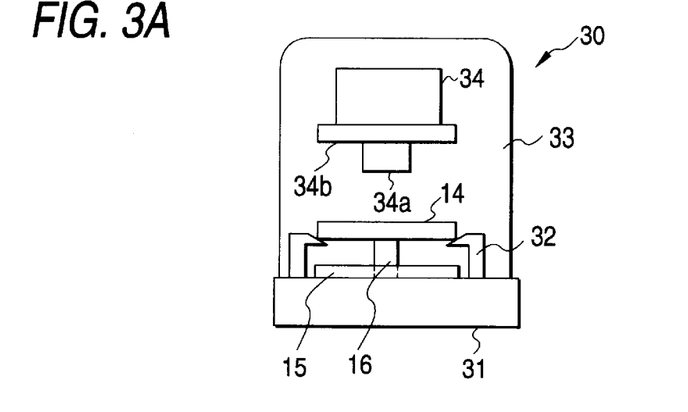
FIGS. 3A through 3C are illustrations for specifically describing positional accuracy of a bonded substrate in relation to a center boss and a pressing method with regard to the method of manufacturing a two-layer disk according to the first embodiment.
Figure 3B:
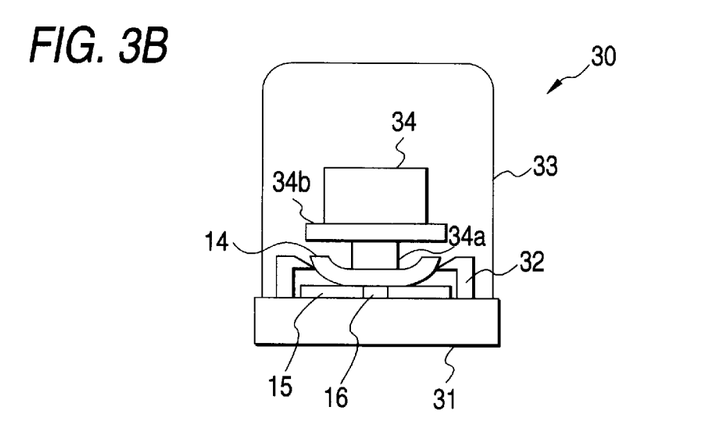
Figure 3C:
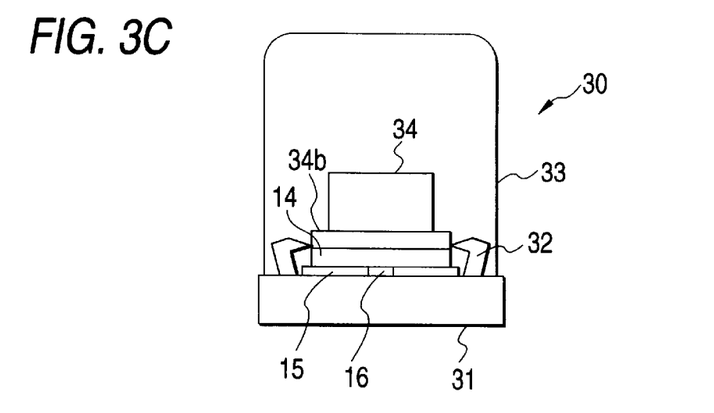

With reference to FIGS. 3A through 3C, there will be described the positional accuracy of the bonded substrate 14 in relation to the center boss 16 and a pressing method specifically. Here, the positional accuracy and the pressing method are described by means of taking the transfer process shown in FIG. 1 as an example. The positional accuracy and pressing method in connection with the disk bonding process shown in FIG. 2 can be described by means of an identical idea.

FIGS. 3A through 3C show procedures for performing the above described transfer process by means of a vacuum pressing method using a vacuum pressing machine. Incidentally, these procedures are applied to a case where a UV curing sheet is employed. In case of employing a UV curing resin, a spinner (not shown) is utilized. As shown in FIG. 3A, the center boss 16 is provided in the center of a stage 31 of a vacuum pressing machine 30. As described above, the stamper 15 is set on the stage 31 while the center hole of the stamper 15 is set to the center boss 16. Incidentally, if the inner diameter of the stamper 15 is larger than the outer diameter of the center boss 16, a donut-shaped member (not shown) is inserted into a clearance between the outer diameter of the center boss 16 and the inner diameter of the stamper 15 to align both centers with each other. On the other hand, a support member 32 is provided on the stage 31 and the bonded substrate 14 is placed such that an outer periphery of the bonded substrate 14 is supported by the support member 32.

Incidentally, in advance of the transfer process, an inside of the vacuum pressing machine 30 sealed with a cover 33 is evacuated by means of action of a vacuum pump (not shown), thereby preventing entry of air into a space between the bonded substrate 14 and the stamper 15 during the transfer process.

A cylindrical press member 34 to be used for pressing action is provided in the vacuum pressing machine 30. The vacuum pressing machine 30 is in a stand-by condition while a center section 34a protrudes downward from a peripheral section 34b. As shown in FIG. 3A, the press member 34 is moved downward when performing the transfer process. As shown in FIG. 3B, the bonded substrate 14 is pressed downward in a vertical direction by the center section 34a of the press member 34. The center section 34a and surroundings thereof are brought into close contact with the stamper 15 while the bonded substrate 14 keeps a position relation to the center boss 16. On the other hand, an outer periphery of the bonded substrate 14 is in a state that a cross section thereof is curved while being in contact with the support member 32.

As shown in FIG. 3C, the press member 34 other than the center section 34a is lowered so that the peripheral section 34b is made coplanar with the center section 34a. As a result, a contact portion between the bonded substrate 14 and the support member 32 is pressed downward. Hence, the support members 32 are tilted outside and the outer periphery of the bonded substrate 14 is released from the support member 32 and can be moved downward. Thus, the entire bonded substrate 14 is brought into close contact with the stamper 15 to transfer the pit pattern thereto.

AS shown in FIGS. 3B and 3C, a horizontal position of the bonded substrate 14 is regulated by the center boss 16. While the inner diameter of the mount hole 14a of the bonded substrate 14 is aligned with the outer diameter of the center boss 16, the bonded substrate 14 is pressed as the above described. Accordingly, the positional accuracy of this embodiment is determined by dimensional accuracy of the mount hole 14a of the bonded substrate 14 and dimensional accuracy of the center boss 16. So long as the dimensional accuracy of the mount hole 14a and that of the center boss 16 is set to target numerical values in advance, there can be prevented occurrence of a positional displacement exceeding tolerance during the bonding process.

In the first embodiment, the glass substrate 13 is employed as a reinforcement substrate to be integrated with the bonded substrate 14. Hence, a certain degree of stiffness is maintained during the above described alignment operation, and non-uniform deformation or warpage does not arise. More specifically, there is prevented occurrence of positional misalignment of overall substrate while the center of the bonded substrate 14 being aligned with the center boss 16. Hence, the entire bonded substrate 14 can ensure a certain degree of dimensional accuracy with respect to the stamper 15 and the eccentricity of the bonded substrate 14 in relation to the stamper 15 can be held within an appropriate range.

In case of performing the disk bonding process by means of the method shown in FIG. 3, as shown in FIG. 3B, the center of the bonded substrate 14 and surroundings thereof are pressed by the center section 34a of the press member 34. Subsequently, the outer periphery of the bonded substrate 14 is pressed. Hence, air bubbles and wrinkles are unlikely to arise in the surface to be brought into close contact. Furthermore, since a distribution of pressure applied to the bonded substrate 14 is kept uniform, for example, there is an effect uniformizing the thickness of the bonding intermediate layer to be used in the bonding process.

According to the first embodiment as described above, when manufacturing a two-layer disk, even if it is obliged to form the cover layer 11 thin due to improvement of recording density, the glass substrate 13 integrated with the cover layer 11 ensures stiffness. Hence, accurate alignment is performed to enable to prevent the occurrence of the positional displacement or the eccentricity during the transfer process and the bonding process. Further, handling and transport of the cover layer 11 become easier than in a case where the cover layer 11 is thin and has low stiffness.

Figure 4A:
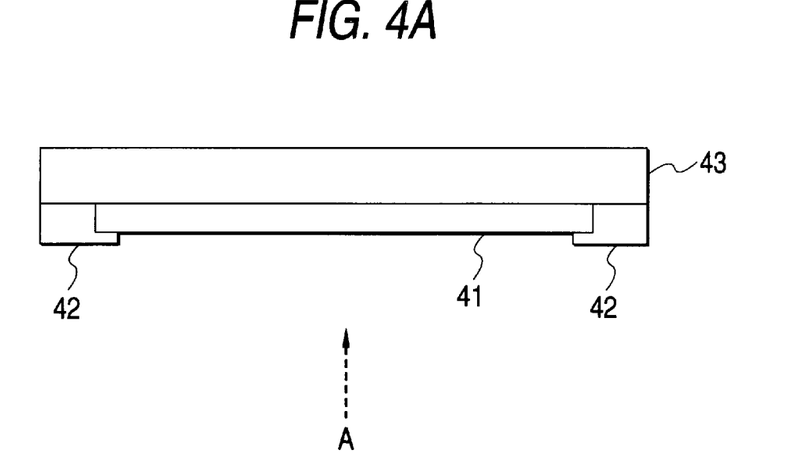
FIGS. 4A and 4B are illustrations for describing a modification of the reinforcement process with regard to a method of manufacturing a disk according to the first embodiment.
Figure 4B:
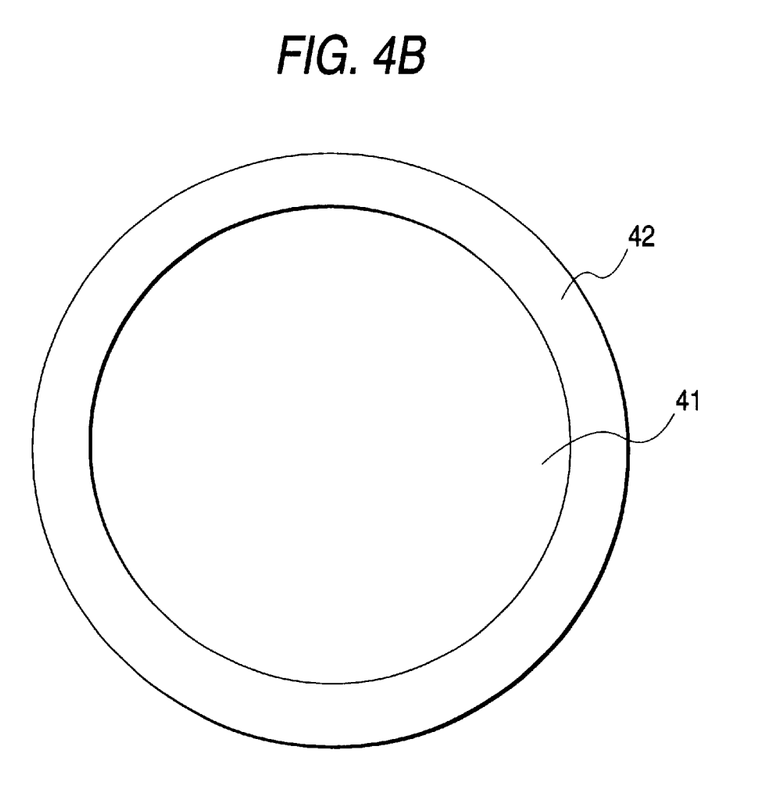

In connection with the disk manufacturing method according to the first embodiment, a modification of the reinforcement process will be described with reference to FIG. 4. The first embodiment has described a case where the cover layer 11 and the glass substrate 13 are integrated together by the adhesive strength of the adhesion layer 12. In the present modification, there will be described a case where the cover layer 11 and the glass substrate 13 are mechanically brought into close contact with each other and fixed together by using a fixing member. FIG. 4A is a view showing external appearance of the modification and FIG. 4B is a view viewed in a direction A of FIG. 4A.

FIG. 4A shows a cover layer 41, a glass substrate 43, and a ring-shaped fixing member 42. There are employed the cover layer 41 and the glass substrate 43, which are slightly greater in diameter than those employed in the case shown in FIG. 1. The diameter of the glass substrate 43 is set to be greater than that of the cover layer 41. The ring-shaped fixing member 42 is bonded along an outer periphery of the glass substrate 43 by a detachable adhesive to press the cover layer 41 while the cover layer 41 being brought into close contact with the glass substrate.

In the transfer process and the disk bonding process in order to prevent occurrence of positional misalignment between the glass substrate 40 and the cover layer 41, it is necessary to apply higher tension to the fixing member 42 and to maintain high surface accuracy of a close-contact surface between the glass substrate 43 and the cover layer 41 so as to prevent entry of air. In the separation process, the fixing member 42 is removed from the glass substrate 43, thereby enabling to separate the cover layer 41 from the glass substrate 43. Incidentally, if an outer periphery enlarged a diameter of the cover layer 41 is cut after the transfer process or the disk bonding process is completed, the cover layer 41 can be made equal in diameter with that shown in FIG. 1.

(Second Embodiment)

A second embodiment of the present invention will be described. The second embodiment differs from the first embodiment in that a transfer process is to be performed before a reinforcement process.

Figure 5A:
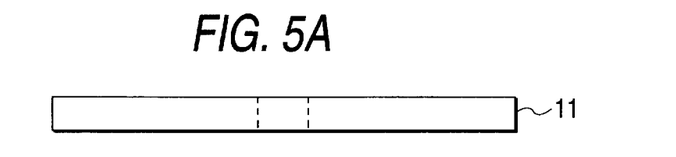
FIGS. 5A through 5D are illustrations for describing processes corresponding to those shown in FIG. 1 described in connection with the first embodiment, with regard to a method of manufacturing a two-layer disk according to a second embodiment.

FIGS. 5A through 5D are illustrations for describing, in a method of manufacturing a two-layer disk according to the second embodiment, processes corresponding to those shown in FIG. 1 of the first embodiment. First, as shown in FIG. 5A, the cover layer 11 is prepared. Subsequently, in contrast with the case of FIG. 1, processing proceeds to a transfer process without carrying out the reinforcement process at this step.

Figure 5B:
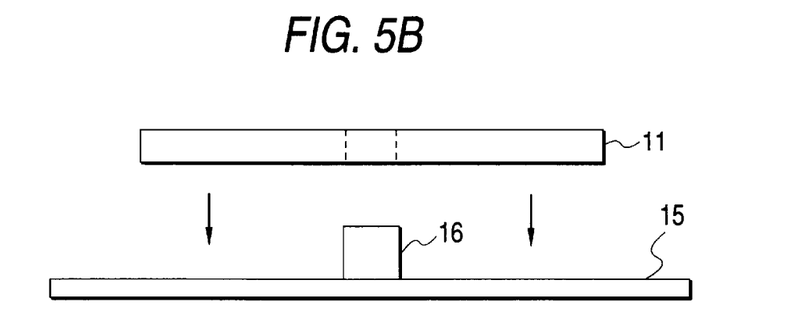

As shown in FIG. 5B, in the transfer process, the cover layer 11 is subject to transfer by using the stamper 15. While the cover layer 11 is aligned with the center boss 16 with a state where the center hole of the stamper 15 is set to the center boss 16, the cover layer 11 is integrated with and pressed to the stamper 15 to perform above described transfer. At this time, since the cover layer 11 is thin and has low stiffness, a roller is used for pressing.

Figure 5C:
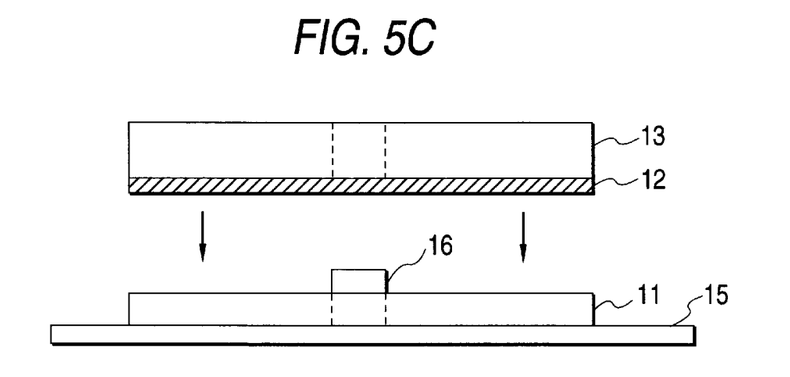
Figure 5D:
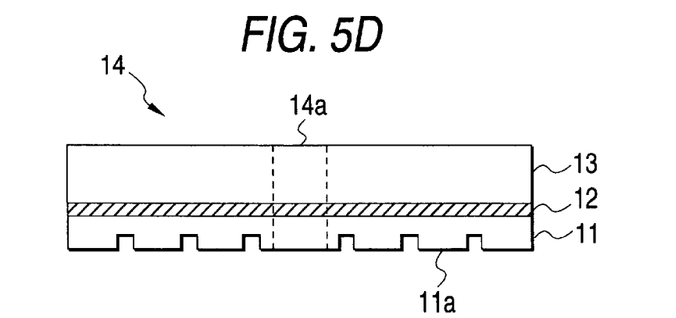

Subsequently, as shown in FIG. 5C, there is prepared the glass substrate 13 having the adhesive layer 12 applied thereon in order to perform the reinforcement process. The glass substrate 13 is bonded to the cover layer 11 integrated with the stamper 15 through the adhesive layer 12. At this time, the glass substrate 13 is pressed in a direction perpendicular to the cover layer 11 while a mount hole of the glass substrate 13 is aligned to the center boss 16. As shown in FIG. 5D, in a state in which the cover layer 11 is separated from the stamper 15, the glass substrate 13 is fixed to the cover layer 11 so that there is constituted the bonded substrate 14 having three-layer structure. The information recording surface 11a formed of a predetermined pit pattern is transferred onto the surface of the cover layer 11.

In the second embodiment, the disk bonding process and the separation process subsequent to the foregoing process are performed in the same manner as shown in FIG. 2 of the first embodiment. Hence, repeated explanations are omitted.

(Third Embodiment)

A third embodiment of the present invention will be described. The third embodiment differs from the first embodiment in that a two-layer disk is manufactured in the disk bonding process in consideration of positional accuracy in a periphery direction of a disk.

Figure 6A:
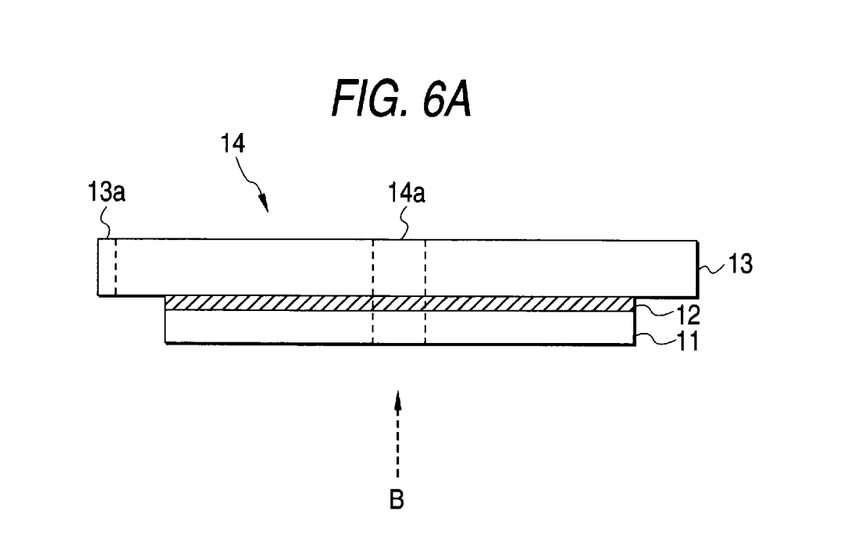
FIGS. 6A and 6B are illustrations showing a structure of a bonded substrate integrally formed of a cover layer and a glass substrate according to a third embodiment.
Figure 6B:
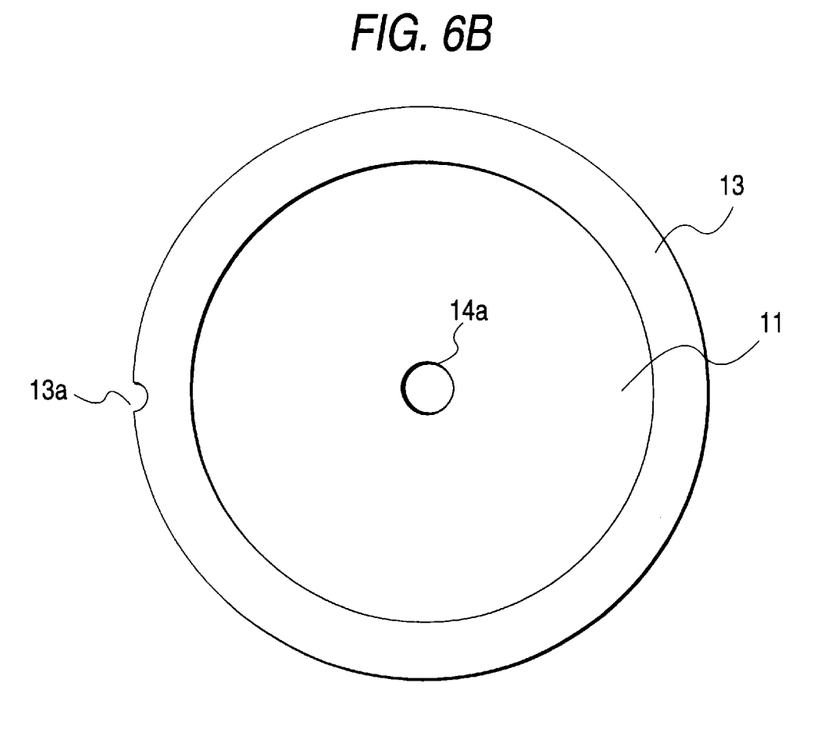

In the third embodiment, a shape of the glass substrate 13 differs from that of the glass substrate 13 according to the first embodiment so that alignment in the peripheral direction of the disk is performed in the bonding process. FIG. 6 is an illustration showing a structure of the bonded substrate 14 according to the third embodiment, in which the cover layer 11 and the glass substrate 13 are integrated together. FIG. 6A is a view of the bonded substrate 14 when viewed from the same side as that in FIG. 1A, and FIG. 6B is a view of the bonded substrate 14 when viewed in direction B of FIG. 6A.

As shown in FIG. 6A, the bonded substrate 14 according to the third embodiment has the glass substrate 13 greater in diameter than the glass substrate 13 shown in FIG. 1A. In addition to the mount hole 14a of the center of the glass substrate 13, a notch 13a is formed in the periphery of the glass substrate 13. As shown in FIG. 6B, alignment can be performed by inserting a projecting member, which is described later and has a circular cross section matching the cross sectional shape of the notch 13a. As mentioned above, alignment is performed by using the mount hole 14a and the notch 13a as positional references, thereby ensuring positional accuracy in the peripheral direction of a disk in addition to positional accuracy of the disk center.

Figure 7:
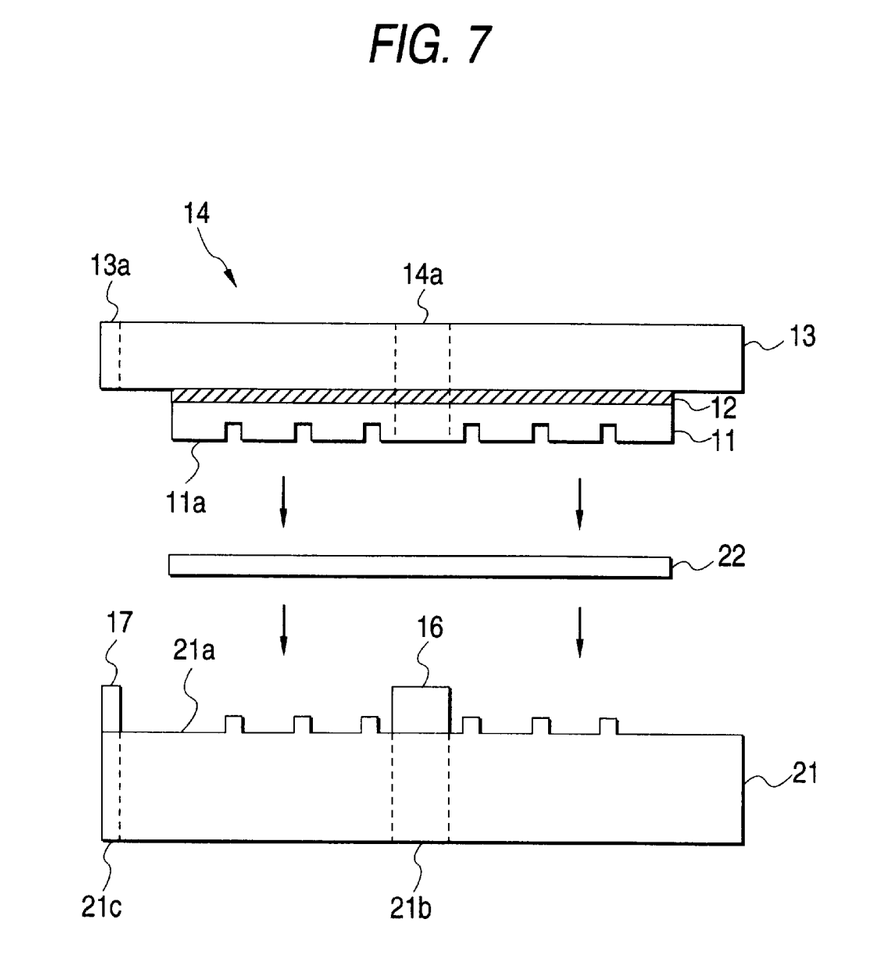
FIG. 7 is an illustration of a disk bonding process according to the third embodiment, corresponding to that shown in FIG. 2B described in connection with the first embodiment.

FIG. 7 is an illustration of a disk bonding process according to the third embodiment, corresponding to FIG. 2B of the first embodiment. As shown in FIG. 7, the substrate 21 has a larger diameter as well as the glass substrate 13. A notch 21c corresponding to the notch 13a of the glass substrate 13 is formed in the periphery of the substrate 21. In the center of the substrate 21, the mount hole 21b is set to the center boss 16, and in the periphery of the substrate 21, the notch 21c is set to the projecting member 17.

The bonded substrate 14 is caused to approach the substrate 21 while being aligned with both the center boss 16 and the projecting member 17. The mount hole 14a is set to the center boss 16 and the notch 13a is set to the projecting member 17. Specific processing of the bonding process other than that the alignment is performed in the same manner in the first embodiment.

It is necessary that a peripheral section of the substrate 21 exceeding the size of the cover layer 11 is cut after the disk bonding process and the separation process to identical the diameters of the two-layer disk with each other.

Figure 8:
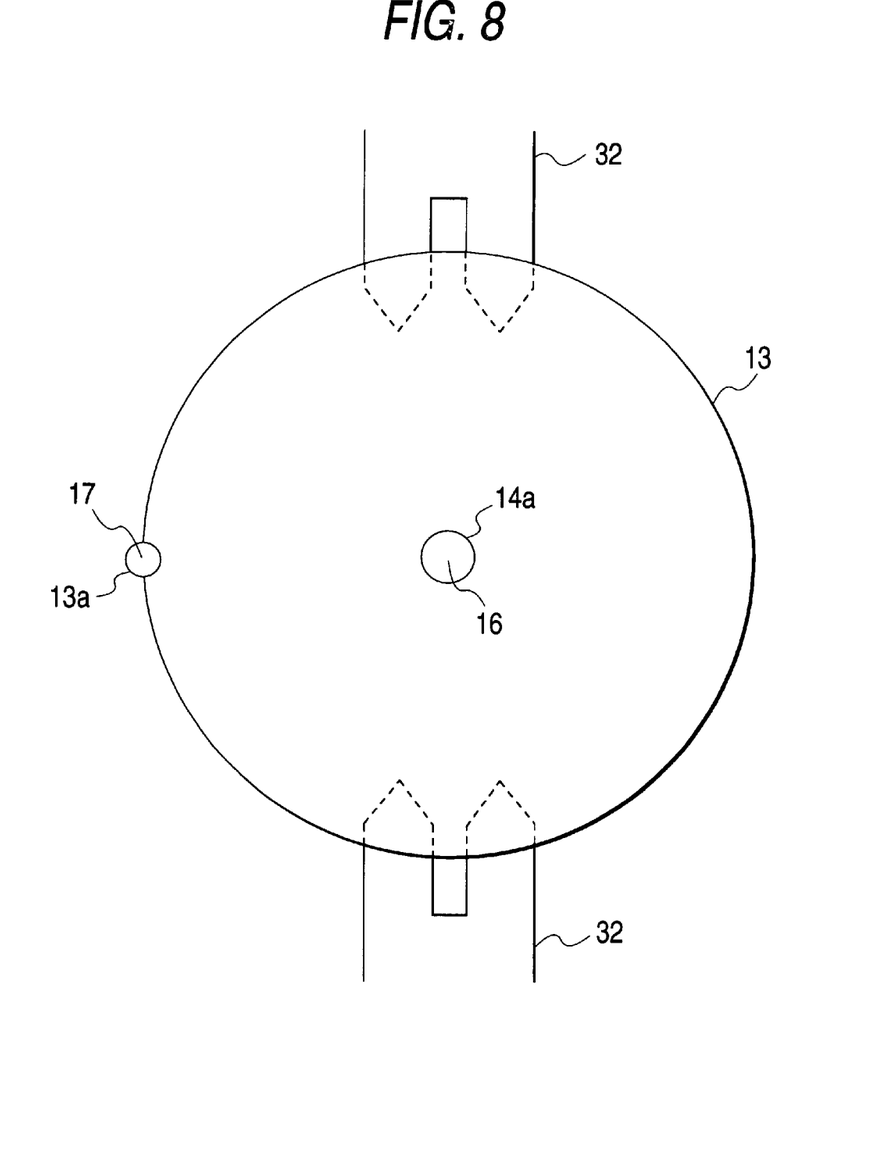
FIG. 8 is an illustration of the bonded substrate according to the third embodiment placed on a vacuum pressing machine when viewed from top.

A disposal relation in a state where the bonded substrate 14 according to the third embodiment is set on the vacuum pressing machine 30 shown in FIG. 3 will be described. FIG. 8 is an illustration of the bonded substrate 14 placed on the vacuum pressing machine 30 having the construction shown in FIG. 3, when viewed from top thereof. As shown in FIG. 8, the substrate 21 is placed to be supported by two support members 32 of the vacuum pressing machine 30. On the other hand, the projecting member 17 is provided in the vacuum pressing machine 30 in a side direction in relation to a direction interconnecting the two support members 32. Pressing is performed in a state where the notch 13a of the glass substrate 13 (and the notch 21c of the substrate 21) is aligned by the projecting member 17. In this case, positional accuracy in the peripheral direction of the disk is defined dependent on the dimensional accuracy of the notch 13a (and that of the notch 21c) and the dimensional accuracy of the projecting member 17.

The third embodiment is effective for a case where the status of an information recording surface of the two-layer disk changes with dependent on the peripheral direction of a disk. For example, when pre-address regions are provided in a recording area of the two-layer disk at predetermined intervals, there is a necessity of accurately aligning disks with reference to the peripheral direction thereof so as to change the state of a spoke-shaped crystal in the peripheral direction of the disk. The third embodiment is effective for producing a two-layer disk under such conditions.

Figure 9A:
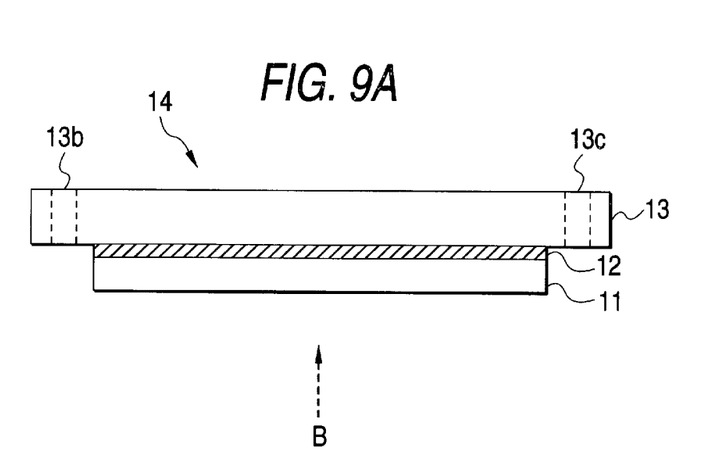

A modification of the third embodiment will be described. In the modification, in order to align disks in the peripheral direction thereof in the bonding process, alignment is performed not in the center of the disks but in two points on the peripheries of disks. FIG. 9 is an illustration showing the structure of the bonded substrate 14 according to the modification with which the cover layer 11 and the glass substrate 13 are integrated, corresponding to FIG. 6. As shown in FIG. 9A, the mount hole 14a is formed in the center of the glass substrate 13 and two mount holes 13b and 13c, each having a circular cross section, are formed in a peripheral section so as to oppose each other. Also in the modification, the two mount holes 13b and 13c are taken as positional references to perform alignment. Thus, positional accuracy over the entire disk including the disk peripheral direction can be ensured to realize the above described effect.

Figure 10:
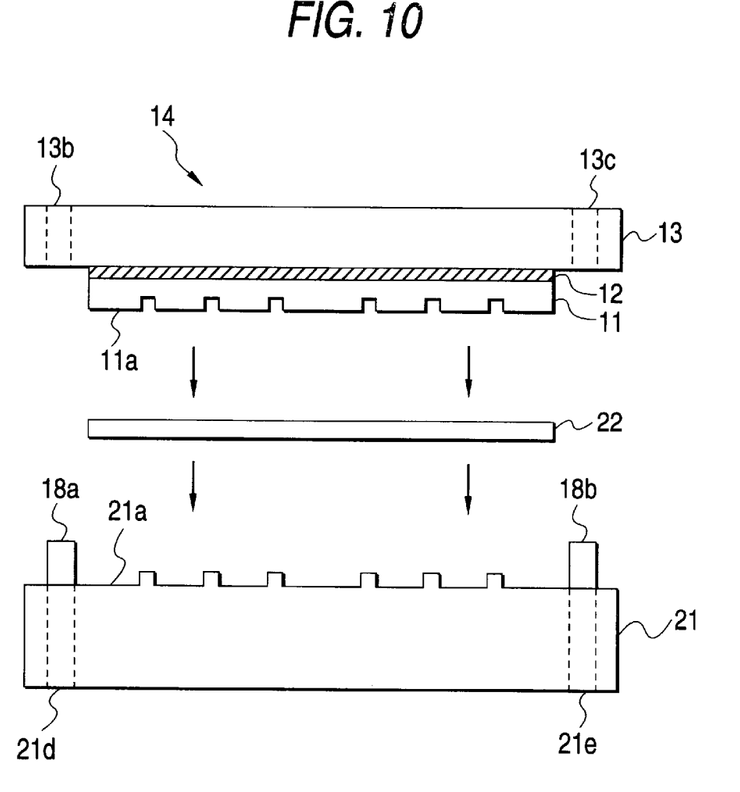
FIG. 10 is an illustration of the disk bonding process according to the modification of the third embodiment, corresponding to that shown in FIG. 7.

FIG. 10 is an illustration of a disk bonding process according to the modification, corresponding to FIG. 7. As shown in FIG. 10, two mount holes 21d and 21e are formed in the periphery of the substrate 21, which correspond to the mount holes 13b and 13c of the glass substrate 13. The substrate 21 is in a state where the mount hole 21b is set to a projecting member 18a and the mount hole 21e is set to a projecting member 18b.

The bonded substrate 14 is caused to approach the substrate 21 while being aligned with the two projecting members 18a and 18b. The mount hole 13b is set to the projecting member 18a and the mount hole 13c is set to the projecting member 18b. Incidentally, in other respects, the modification is identical with the third embodiment (see FIG. 7).

Figure 11:
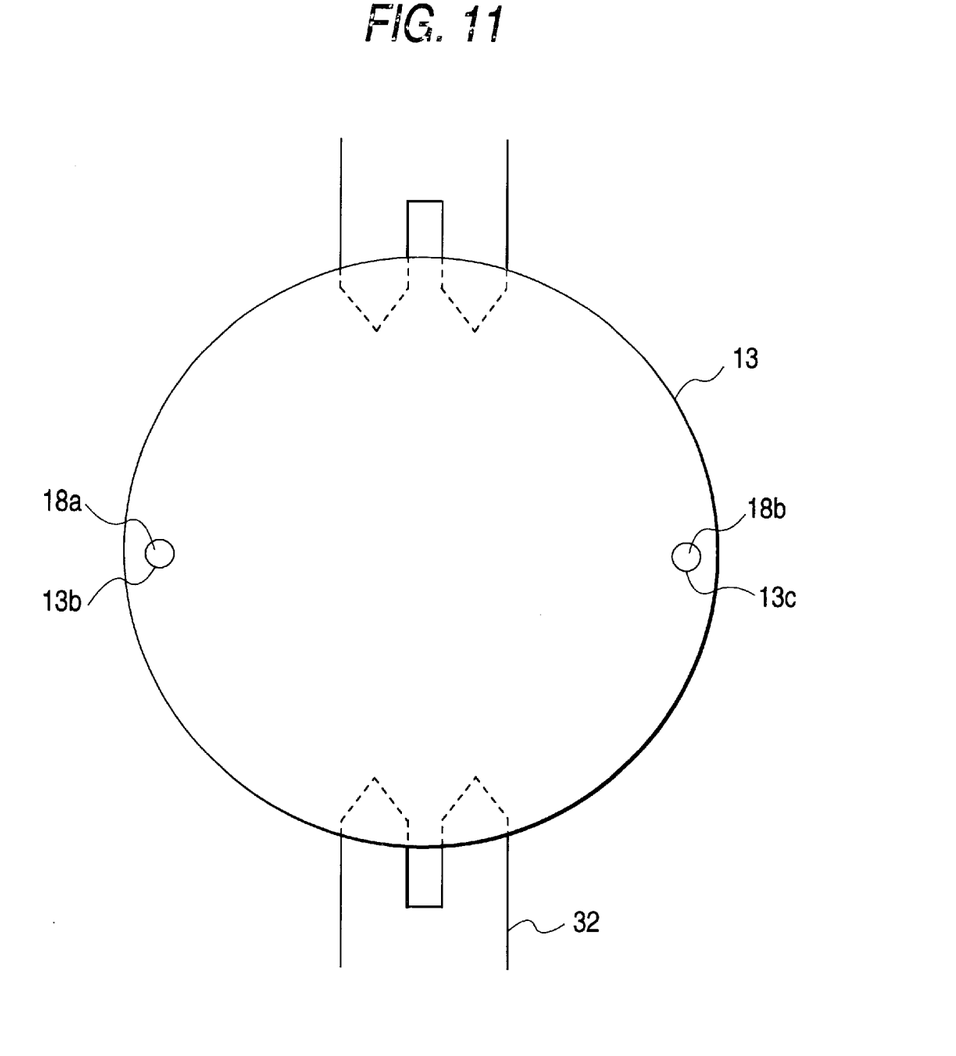
FIG. 11 is an illustration showing the bonded substrate according to the modification of the third embodiment when the substrate is placed on the vacuum pressing machine.

A disposal relation in a state where the bonded substrate 14 according to the modification is set on the vacuum pressing machine 30 shown in FIG. 3 will be described. FIG. 11 is a view of the bonded substrate 14 placed on the vacuum pressing machine 30 in the same manner as in FIG. 8, when viewed from top thereof. As shown in FIG. 11, comparing with FIG. 8, there is not provided the center boss 16 in the substrate 14, and the two projecting members 18a and 18b are provided in a side direction in relation to a direction interconnecting two support members 32. Pressing is performed in a state where the mount holes 13b and 13c of the glass substrate 13 (and the mount holes 21d and 21e of the substrate 21) are aligned with the projecting members 18a and 18b, respectively. In this case, positional accuracy in the peripheral direction of the disk is defined dependent on the dimensional accuracy of the mount holes 13b and 13c (that of the mount holes 21d and 21e) and the dimensional accuracy of the projecting members 18a and 18b.

Incidentally, in the first through third embodiments as described above, there have been described the cases where the present invention is applied to the method of manufacturing a two-layer disk. The present invention can also be applied to a method of manufacturing a general disk having a laminated structure including a single-layer disk. Incidentally, in case of a single-layer disk, it is assumed that the information recording surface 21a is not formed on the substrate 21 shown in FIG. 2. In the disk manufacturing method, there has been described the case where the method includs the reinforcement process, the transfer process, and the bonding process. However, the present invention can be applied to a case where the method includes only either the transfer process or the bonding process in addition to the reinforcement process.

As has been described, according to the present invention, a first substrate of a disk having a laminated structure is reinforced and then, a transfer process and a disk bonding process are performed. Thus, occurrence of a positional misalignment or eccentricity is prevented while a high positional accuracy is ensured and bonding disks and transfer of an information recording surface can be performed with high accuracy.

What is claimed is:

1. A disk manufacturing method for manufacturing a disk having a laminated structure, comprising the steps of:

bonding a reinforcement substrate for reinforcing a first substrate onto the first substrate acting as one layer of the disk;

aligning the first substrate fixed to the reinforcement substrate to a second substrate serving as another layer of the disk;

bonding the first substrate fixed to the reinforcement substrate to the second substrate through an intermediate adhesive layer; and separating the reinforcement substrate from the first substrate.

2. A disk manufacturing method for manufacturing a disk having a laminated structure, comprising the steps of:

bonding through an adherence layer a reinforcement substrate for reinforcing a first substrate onto the first substrate acting as one layer of the disk;

aligning the first substrate fixed to the reinforcement substrate to a second substrate serving as another layer of the disk;

bonding the first substrate fixed to the reinforcement substrate to the second substrate through an intermediate adhesive layer; and separating the reinforcement substrate from the first substrate.

3. The method according to claim 2, further comprising the steps of:

aligning the first substrate to a stamper having a pit pattern; and transferring the pit pattern onto the first surface.

4. The method according to claim 3, wherein the aligning step of aligning the first substrate to the stamper, the transferring step, and the other steps are performed in this order.

5. The method according to claim 1, wherein the fixing step fixes the reinforcement substrate to the first substrate through an adhesive layer; and the separating step separates the reinforcement substrate from the first substrate by reducing adhesive strength of the adhesive layer.

6. The method according to claim 1, wherein the fixing step uses a fixing member to fix the reinforcement substrate to the first substrate; and the separating step removes the fixing member to separate the reinforcement substrate from the first substrate.

7. The method according to claim 1, wherein the reinforcement substrate has higher rigidity than the first substrate.

8. The method according to 3, wherein the alignment step aligns the first substrate fixed to the reinforcement substrate to the second substrate in relation to a peripheral direction of the first substrate fixed to the reinforcement substrate.

9. The method according to claim 3, wherein the alignment step uses a center and peripheral portion of the first substrate fixed to the reinforcement substrate as reference positions to align the first substrate fixed to the reinforcement substrate to the second substrate.

10. The method according to claim 8, wherein the alignment step uses a plurality of peripheral portions of the reinforcement substrate as reference positions to align the first substrate fixed to the reinforcement substrate to the second substrate.

11. A disk transfer method comprising the steps of:
bonding through an adherence layer a reinforcement substrate for reinforcing a first substrate onto the first substrate acting as one layer of the disk;
aligning the first substrate to a stamper having a pit pattern;
transferring the pit pattern onto the first substrate; and
separating the reinforcement substrate from the first substrate.

* * * * *